(12) United States Patent
Sun et al.

(10) Patent No.: US 12,394,894 B2
(45) Date of Patent: Aug. 19, 2025

(54) DUAL-BEAM FEED NETWORK AND HYBRID NETWORK ANTENNA WITH DUAL-BEAM FEED NETWORK

(71) Applicants: PROSE TECHNOLOGIES (SUZHOU) CO., LTD., Suzhou (CN); PROSE TECHNOLOGIES LLC, Mount Olive, NJ (US)

(72) Inventors: He Sun, Suzhou (CN); Shengguang Wang, Suzhou (CN); Zhongcao Yang, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 357 days.

(21) Appl. No.: 18/181,822

(22) Filed: Mar. 10, 2023

(65) Prior Publication Data
US 2023/0216190 A1    Jul. 6, 2023

Related U.S. Application Data

(63) Continuation of application No. PCT/CN2020/114499, filed on Sep. 10, 2020.

(51) Int. Cl.
*H01Q 3/34* (2006.01)
*H01Q 19/10* (2006.01)

(52) U.S. Cl.
CPC ............... *H01Q 3/34* (2013.01); *H01Q 19/10* (2013.01)

(58) Field of Classification Search
CPC .................................. H01Q 3/34; H01Q 19/10
(Continued)

(56) References Cited

U.S. PATENT DOCUMENTS 5,623,269 A * 4/1997 Hirshfield .......... H04B 7/18571
342/371
6,097,335 A    8/2000 Cassen et al.
(Continued)

FOREIGN PATENT DOCUMENTS

CN    102064379 A    5/2011
CN    102683897 A    9/2012
(Continued)

OTHER PUBLICATIONS

World Intellectual Property Organization (WIPO) International Search Report for PCT/CN2020/114499 May 31, 2021 6 pages (with translation).

*Primary Examiner* — Harry K Liu
(74) *Attorney, Agent, or Firm* — ANOVA LAW GROUP, PLLC

(57) ABSTRACT

A dual-beam feed network includes a first power dividing circuit, a second power dividing circuit, and a third power dividing circuit. The first power dividing circuit is configured to convert a beam signal of a first channel into a plurality of first signals, input one first signal into a third power dividing circuit, and respectively input each remaining first signal to a corresponding antenna radiation unit. The second power dividing circuit is configured to convert a beam signal of a second channel into a plurality of second signals, input one second signal into the third power dividing circuit, and respectively input each remaining second signal to a corresponding antenna radiation unit. The third power dividing circuit is configured to couple and input the received first signal and the received second signal to a shared antenna radiation unit.

12 Claims, 5 Drawing Sheets

(58) Field of Classification Search
USPC .......................................................... 342/371
See application file for complete search history.

(56) References Cited

U.S. PATENT DOCUMENTS

2019/0214740 A1* 7/2019 Luo ...................... H01Q 21/061
2020/0358190 A1* 11/2020 Chen ........................ H01Q 5/28

FOREIGN PATENT DOCUMENTS

| CN | 109155197 A |   | 1/2019 |   |   |
|----|-------------|---|--------|---|---|
| CN | 110970712 A |   | 4/2020 |   |   |
| CN | 110994151 A |   | 4/2020 |   |   |
| CN | 110994203 A | * | 4/2020 | ............... | H01Q 1/50 |
| EP | 2860822 B1  | * | 4/2017 | ............ | H01Q 1/246 |
| WO | 2013185281 A1 |   | 12/2013 |   |   |

* cited by examiner

US 12,394,894 B2

DUAL-BEAM FEED NETWORK AND HYBRID NETWORK ANTENNA WITH DUAL-BEAM FEED NETWORK

CROSS-REFERENCE TO RELATED APPLICATION

This application is a continuation application of PCT application PCT/CN2020/114499, filed on Sep. 10, 2020, the entire content of which is incorporated herein by reference.

TECHNICAL FIELD

The present disclosure generally relates to the antenna technology field, and more particularly, to a dual-beam feed network and a hybrid network antenna with the dual-beam feed network.

BACKGROUND

As one of core apparatuses to achieve mobile communication network coverage, a base station antenna is very important in a mobile communication system. The base station antenna is configured to convert high-frequency electromagnetic energy in a transmission wire into electromagnetic waves in free space or convert the electromagnetic waves in free space into high-frequency electromagnetic energy. The design of the base station antenna directly affects the quality of the whole mobile communication system. As a number of mobile communication users continue to grow, and new applications and needs for mobile communication continue to increase, more base station antennas are needed. As the number of users continues to grow, the base station antenna resources cannot satisfy the needs of the users. Especially for the application of 5G technology, a large demand for base station antennas is required. Miniaturized base station antennas can effectively reduce the need for spatial resources and lower transportation cost and manufacturing cost. Thus, the miniaturization design of the base station antennas has become a research topic for engineers.

SUMMARY

Embodiments of the present disclosure provide a dual-beam feed network, including a first power dividing circuit, a second power dividing circuit, and a third power dividing circuit. The first power dividing circuit is configured to convert a beam signal of a first channel into a plurality of first signals, input one first signal of the plurality of first signals into a third power dividing circuit, and respectively input each remaining first signal of the plurality of first signals to a corresponding first antenna radiation unit. The second power dividing circuit is configured to convert a beam signal of a second channel into a plurality of second signals, input one second signal of the plurality of second signals into the third power dividing circuit, and respectively input each remaining second signal of the plurality of second signals to a corresponding second antenna radiation unit. The third power dividing circuit is configured to couple and input the received first signal and the received second signal to a third antenna radiation unit. The beam signal of the first channel and the beam signal of the second channel input to the dual-beam feed network have a same operation frequency.

Embodiments of the present disclosure provide a hybrid network antenna, including a dual-beam feed network, a reflector, and at least a dual-beam antenna array. The dual-beam feed network includes a first power dividing circuit, a second power dividing circuit, and a third power dividing circuit. The first power dividing circuit is configured to convert a beam signal of a first channel into a plurality of first signals and input one first signal of the plurality of first signals into a third power dividing circuit. Each remaining first signal of the plurality of first signals is respectively input to a corresponding first antenna radiation unit. The second power dividing circuit is configured to convert a beam signal of a second channel into a plurality of second signals and input one second signal of the plurality of second signals into the third power dividing circuit. Each remaining second signal of the plurality of second signals is respectively input to a corresponding second antenna radiation unit. The third power dividing circuit is configured to couple and input the received first signal and the received second signal to a third (shared) antenna radiation unit. The beam signal of the first channel and the beam signal of the second channel input to the dual-beam feed network have a same operation frequency. The first antenna radiation unit(s), the second antenna radiation unit(s), and the third antenna radiation unit are configured to radiate electromagnetic signals, such as dual-beam signals. The reflector includes a first straight member and bend members. The bend members are arranged at two ends of the first straight member. One bend member is formed by bending an end of the first straight member. The reflector has a width direction and a length direction perpendicular to the width direction. Each dual-beam antenna array is correspondingly connected to a dual-beam feed network. The dual-beam antenna array includes two beam antenna sub-arrays. Each beam antenna sub-array includes a plurality of first high-frequency radiation unit arrays arranged at intervals in the width direction of the reflector. The two beam antenna sub-arrays share one first high-frequency radiation unit array. The shared first high-frequency radiation unit array is arranged at the first straight member, In the two beam antenna sub-arrays, the remaining first high-frequency radiation unit arrays of the one beam antenna sub-array are arranged at intervals at a bend member on a side of the reflector. The remaining first high-frequency radiation unit arrays in the other beam antenna sub-array are arranged at intervals at the bend member on the other side of the reflector.

REFERENCE NUMERALS

10 First power dividing circuit, 20 Second power dividing circuit, 30 Third power dividing circuit, 40 Reflector, 41 First straight member, 42 Bend member, 43 Second straight member, 50 Beam antenna sub-array, 51 First high-frequency radiation unit array, 60 Low-frequency antenna array, 61 Low-frequency radiation unit, 70 High-frequency antenna array, 71 Second high-frequency radiation unit array, a First antenna radiation unit, b First antenna radiation unit, c Second antenna radiation unit, d Second antenna radiation unit, e Third antenna radiation unit.

DETAILED DESCRIPTION OF THE EMBODIMENTS

The technical solutions of embodiments of the present disclosure are described in detail in connection with the accompanying drawings of the present disclosure.

The present disclosure provides a dual-beam feed network, which realizes high co-polarization isolation, reduces a number of antenna radiation units, and reduces a size of an antenna.

Figure 1:
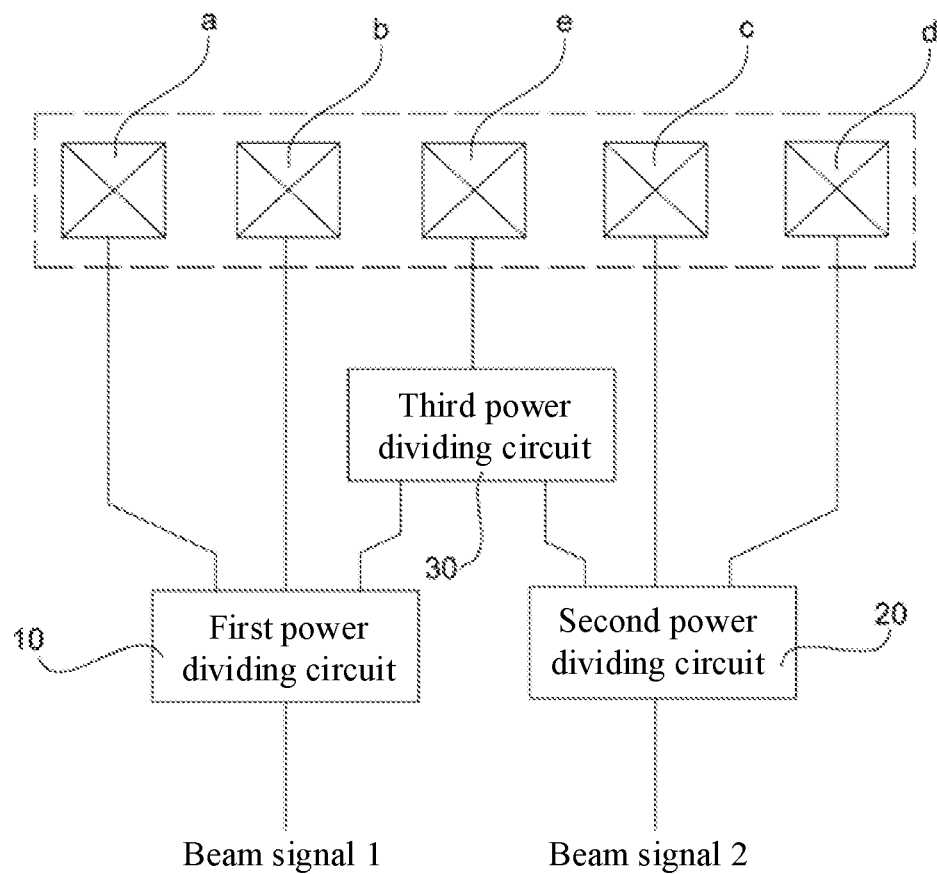
FIG. 1 is a schematic structural block diagram of a dual-beam feed network according to some embodiments of the present disclosure.

FIG. 1 is a schematic structural block diagram of a dual-beam feed network according to some embodiments of the present disclosure. The dual-beam feed network includes a first power dividing circuit 10, a second power dividing circuit 20, and a third power dividing circuit 30. In some embodiments, the dual-beam feed network can include two signal input terminals configured to input a beam signal of a first channel and a beam signal of a second channel of different operation frequencies into the dual-beam feed network.

The first power dividing circuit 10 can include an input terminal and a plurality of output terminals. The input terminal can be used as a signal input terminal of the dual-beam feed network. An output terminal of the plurality of output terminals can be coupled with an input terminal of the third power dividing circuit 30. Each output terminal of the rest of the plurality of terminals can be correspondingly coupled with a first antenna radiation unit and can be configured to convert the beam signal of the first channel (i.e., beam signal 1) input by the dual-beam feed network into a plurality of first signals with an equal amplitude and an equal phase. As shown in FIG. 1, the first power dividing circuit 10 converts beam signal 1 into three first signals. One first signal is input to the third power dividing circuit 30, and the other two first signals are input to two first antenna radiation units a and b, respectively.

The second power dividing circuit 20 can include an input terminal and a plurality of output terminals. The input terminal can be used as another signal input terminal of the dual-beam feed network. One output terminal of the plurality of output terminals can be coupled with the other input terminal of the third power dividing circuit 30. Each output terminal of the rest of the plurality of output terminals can be correspondingly coupled with a second antenna radiation unit and can be configured to convert the beam signal of the second channel (i.e., beam signal 2) input by the dual-beam feed network into a plurality of second signals with an equal amplitude and an equal phase. As shown in FIG. 1, the second power dividing circuit 20 converts beam signal 2 into three second signals. One second signal is input to the third power dividing circuit 30, and the other two second signals are input to two second antenna radiation units c and d, respectively.

The third power dividing circuit 30 can include two input terminals and one output terminal. The two input terminals can be connected to the first power dividing circuit 10 and the second power dividing circuit 20, respectively. The output end can be coupled with a third antenna radiation unit and can be configured to convert two signals (the first signal and the second signal) into one signal. As shown in FIG. 1, the third power dividing circuit 30 converts the input two signals into one signal and then inputs the signal into the third antenna radiation unit e.

In some embodiments, the first power dividing circuit 10 and the second power dividing circuit 20 are power dividers. In some other embodiments, a phase shifter that converts one signal into a plurality of signals can also be used, which can be selected according to actual needs. The third power dividing circuit 30 can be a coupler or a power divider. In some other embodiments, the two signals output by the first power dividing circuit 10 and the second power dividing circuit 20 can be directly input to the shared antenna radiation units in a manner of directly being connected to a cable through a feed box. That is, the third power dividing circuit 30 can be a cable connecting the first power dividing circuit 10 and the second power dividing circuit 20 to the third antenna radiation unit e. One signal output by the first power dividing circuit 10 can be directly output to the third antenna radiation unit e through the corresponding cable. One signal output by the second power dividing circuit 20 can be directly output to the third antenna radiation unit e through the corresponding cable.

As shown in FIG. 1, by taking each of the first power dividing circuit 10 and the second power dividing circuit 20 respectively including one input terminal and three output terminals as an example, an operation principle of the beam feed network is described in detail.

Two beam signals of beam signal 1 and beam signal 2 with a same operation frequency can be input by the dual-beam feed network. The first power dividing circuit 10 can be configured to convert beam signal 1 into three first signals, input one of the first signals to the third power dividing circuit 30, and input the remaining two first signals to the first antenna radiation units a and b, respectively. The second power dividing circuit 20 can be configured to convert beam signal 2 into three second signals, input one of the second signals to the third power dividing circuit 30, and input the remaining two signals to the second antenna radiation units c and d, respectively. The third power dividing circuit 30 can be configured to couple and then input the received two signals into the third antenna radiation unit e. The third antenna radiation unit e can be a shared antenna radiation unit for beam signal 1 and beam signal 2. For beam signal 1, since a fixed difference exists in phases of the three signals arriving at the antenna radiation units (a, b, e). Beam signal 1 can generate a beam tilt effect Similarly, since the phases of the three signals when arriving at the antenna radiation units (c, d, and e) have a fixed difference, beam signal 2 can also generate the beam tilt effect.

In the dual-beam feed network of the present disclosure, two beam signals can share an antenna radiation unit through the third power dividing circuit 30 to reduce the number of the antenna radiation units. As shown in FIG. 1, when the third power dividing circuit is not used, six antenna radiation units can be used in the dual-beam feed network. In the dual-beam feed network of the present disclosure, the number of antenna radiation units can be reduced to 5. While high co-polarization isolation is realized, the size of the antenna can be effectively reduced to make the base station antenna more miniaturized, facilitate transportation, and reduce cost. In addition, since the two beam signals have the same operation frequency, a multiplexer may not be needed to perform a signal coupling process. Only the third power dividing circuit 30, such as a coupler and a power divider, may be needed to perform the signal coupling process, which effectively lowers the manufacturing cost of the base station antenna.

The present disclosure also provides a hybrid network antenna with the above dual-beam feed network. With reference to FIG. 2 to FIG. 5, the hybrid network antenna is described in detail below.

Figure 2:
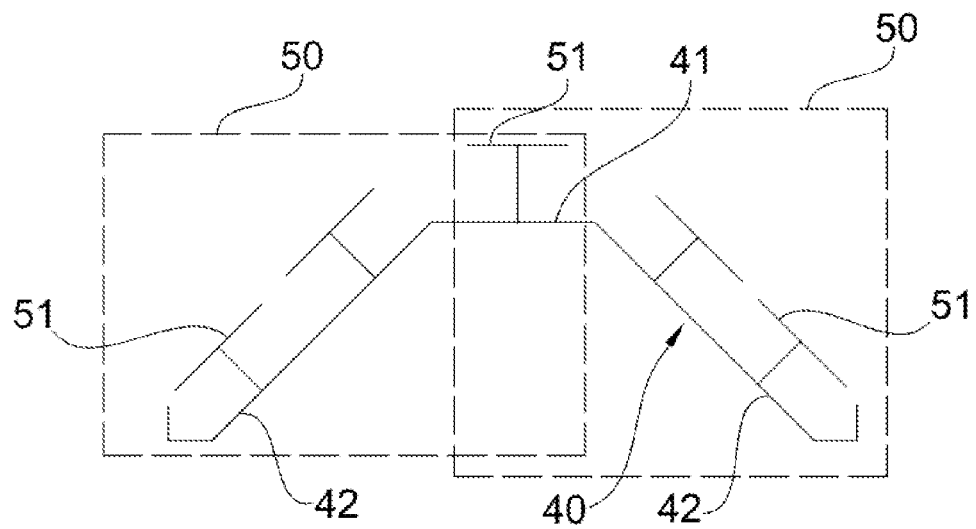
FIG. 2 is a schematic side view of a hybrid network antenna according to some embodiments of the present disclosure.

As shown in FIG. 2, a hybrid network antenna includes a reflector 40, a dual-beam feed network (not shown) mounted at the reflector 40, and at least a dual-beam antenna array. Each dual-beam antenna array can be correspondingly connected to a dual-beam feed network. In some embodiments, the reflector 40 can have a width direction and a length direction perpendicular to the width direction. The reflector 40 includes a first straight member 41 and bend member 42 arranged on two ends of the first straight member 41. The bend member 42 can be formed by bending an end of the first straight member 41. In some embodiments, two ends of the first straight member 41 in the width direction can be bent to form two bend members 42, respectively. Thus, a cross-section of the reflector 40 can be trapezoidal. The first straight member 41 and the two bend members 42 can form three surfaces of a trapezoid. In some embodiments, one or two dual-beam antenna arrays can be arranged at the reflector 40. A plurality of dual-beam antenna arrays can be arranged at intervals along the length direction of the reflector 40. In some other embodiments, a number of the dual-beam antenna arrays can be set according to actual needs.

Further, the dual-beam antenna array can include two beam antenna sub-arrays 50. Each beam antenna sub-array 50 can include a plurality of first high-frequency radiation unit arrays 51 arranged at intervals along the width direction of the reflector 40. Two beam antenna sub-arrays 50 can share a first high-frequency radiation unit array 51. The shared first high-frequency radiation unit array 51 can be arranged at the first straight member 41 of the reflector 40. In the two beam antenna sub-arrays 50, the remaining first high-frequency radiation unit arrays 51 of one beam antenna sub-array can be arranged at intervals at the bend member 42 on a side of the reflector 40. The remaining first high-frequency radiation unit arrays 51 in the other beam antenna sub-array can be arranged at intervals at the bend member 42 on the other side of the reflector 40. Each first high-frequency radiation unit array 51 can include a plurality of first high-frequency radiation units arranged at intervals along the length direction of the reflector 40. The plurality of first high-frequency radiation units can be arranged in a straight line.

During implementation, in the dual-beam feed network, the output terminal of the third power dividing circuit 30 can be connected to the shared first high-frequency radiation unit array 51. The remaining output terminals of the first power dividing circuit 10 can be correspondingly connected to the first high-frequency radiation unit arrays 51 arranged at the bend member 42 on a side of the reflector 40. For example, the remaining two output terminals of the first power dividing circuit 10 are connected to two first high-frequency radiation unit arrays 51. The remaining output terminals of the second power dividing circuit 20 can be correspondingly connected to the first high-frequency radiation unit arrays 51 arranged at the bend member 42 on the other side of the reflector 40, respectively. For example, the remaining two output terminals of the second power dividing circuit 20 can be connected to the two first high-frequency radiation unit arrays 51, respectively. The two beam antenna sub-arrays 50 can form a dual-beam antenna in the dual-beam feed network.

Figure 3:
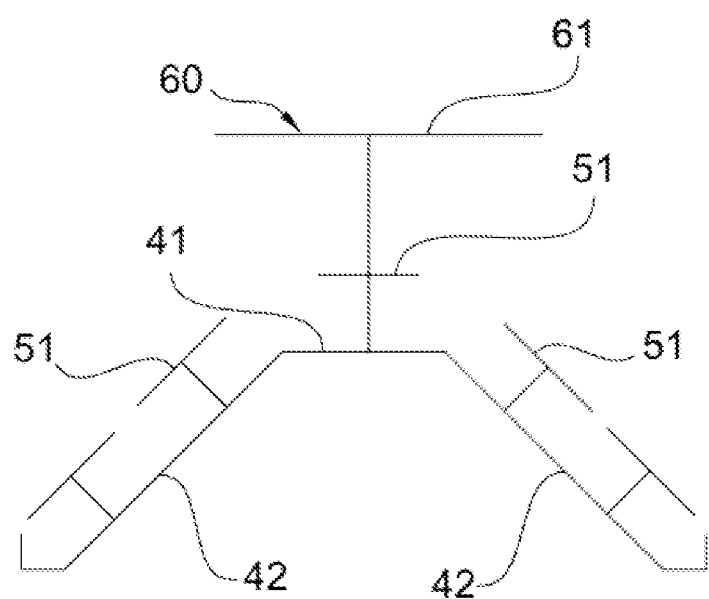
FIG. 3 is a schematic side view of another hybrid network antenna according to some embodiments of the present disclosure.

As shown in FIG. 3, a hybrid network antenna includes a reflector 40, a dual-beam feed network mounted at the reflector 40, a low-frequency antenna array 60, and at least one dual-beam antenna array. Each dual-beam antenna array can be correspondingly connected to a dual-beam feed network. In some embodiments, for the structure of the reflector 40, reference can be made to the above description. Meanwhile, for the structure of the dual-beam antenna subarray 50 and the arrangement of the dual-beam antenna subarray 50 at the reflector 40, reference can be made to the above description, which is not repeated here.

Further, the low-frequency antenna array 60 can be arranged at the first straight member 41 of the reflector 40. In some embodiments, the low-frequency antenna array 60 can be a low-frequency 65° antenna array. The low-frequency antenna array 60 can include a plurality of low-frequency radiation units 61 arranged at intervals along the length direction of the reflector 40. The plurality of low-frequency radiation units 61 can be arranged in an S-shape or straight line shape to have a good signal isolation effect.

In some embodiments, the number of the dual-beam antenna arrays can be set according to actual needs, for example, 1 or 2. When one dual-beam antenna array is arranged at the reflector 40, the dual-beam antenna array and the low-frequency antenna array 60 can form a hybrid network antenna including a low-frequency antenna and a dual-beam antenna. When two dual-beam antenna arrays are arranged at the reflector 40, the two dual-beam antenna arrays can be arranged at an interval along the length direction of the reflector 40. The two dual-beam antenna arrays and the low-frequency antenna array 60 can form the hybrid network antenna including one low-frequency antenna and two dual-beam antennas. During implementation, the low-frequency antenna array 60 and the dual-beam antenna array can be freely combined according to actual needs to satisfy the needs of different regions and/or users.

Figure 4:
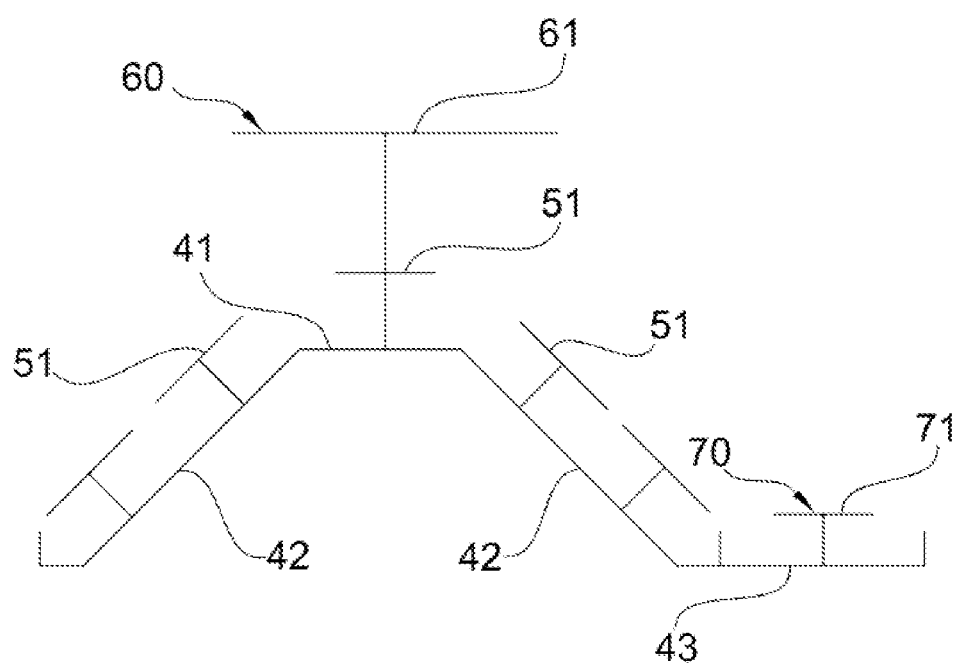
FIG. 4 is a schematic side view of another hybrid network antenna according to some embodiments of the present disclosure.

As shown in FIG. 4, a hybrid network antenna includes a reflector 40, a dual-beam feed network mounted at the reflector 40, a low-frequency antenna array 60, a high-frequency antenna array 70, and at least one dual-beam antenna array. Each dual-beam antenna array can be correspondingly connected to a dual-beam feed network. In some embodiments, the reflector 40 can include a width direction and a length direction perpendicular to the width direction. The reflector 40 includes a first straight member 41, bend members 42 arranged at two ends of the first straight member 41, and a second straight member 43 connected to any one of the bend members 42. The bend member 42 can be formed by bending an end of the first straight member 41. The second straight member 43 can be formed by bending and extending the second bend member 42 in a direction away from the first straight member 41. In some embodiments, the two ends of the first straight member 41 in the width direction can be bent toward two sides to form two bend members 42. One of the bend members 42 can be bent and extended in the direction away from the first straight member 41 to form the second straight member 43. The second straight member 43 can be arranged in parallel or approximately parallel to the first straight member 41.

Further, for the structure of the dual-beam antenna subarray 50 and the arrangement of the dual-beam antenna subarray 50 at the reflector 40, reference can be made to the above description. Meanwhile, for the structure of the low-frequency antenna array 60 and the arrangement of the low-frequency antenna array 60 at the reflector 40, reference can be made to the above description, which is not repeated here.

As shown in FIG. 4, the high-frequency antenna array 70 is arranged at the second straight member 43 of the reflector 40. The high-frequency antenna array 70 includes a second high-frequency radiation unit array 71. The second high-frequency radiation unit array 71 can be staggered with the neighboring first high-frequency radiation unit arrays 51 to reduce interference. The second high-frequency radiation unit array 71 includes a plurality of second high-frequency radiation units arranged at intervals along the length direction of the reflection plate 40. The plurality of second high-frequency radiation units can be arranged at the extended first straight member 41 of the reflector 40, for example, arranged in a straight line. In some embodiments, the high-frequency antenna array 70 can be a high-frequency 65° antenna array.

In some embodiments, the number of dual-beam antenna arrays can be set according to actual needs, for example, 1 or 2. When one dual-beam antenna array is arranged at the reflector 40, the dual-beam antenna array, the low-frequency antenna array 60, and the high-frequency antenna array 70 can form a hybrid network antenna including a low-frequency antenna, a high-frequency antenna array 70, and a dual-beam antenna. When two dual-beam antenna arrays are arranged at the reflector 40, the two dual-beam antenna arrays can be arranged at intervals along the length direction of the reflector 40. The two dual-beam antenna arrays, the low-frequency antenna array 60, and the high-frequency antenna array 70 can form a hybrid network antenna including a low-frequency antenna array 60, a high-frequency antenna array 70, and two dual-beam antennas. During implementation, the low-frequency antenna array 60, the high-frequency antenna array 70, and the dual-beam antenna array can be freely combined according to actual needs to meet the needs of different regions and/or users.

Figure 5:
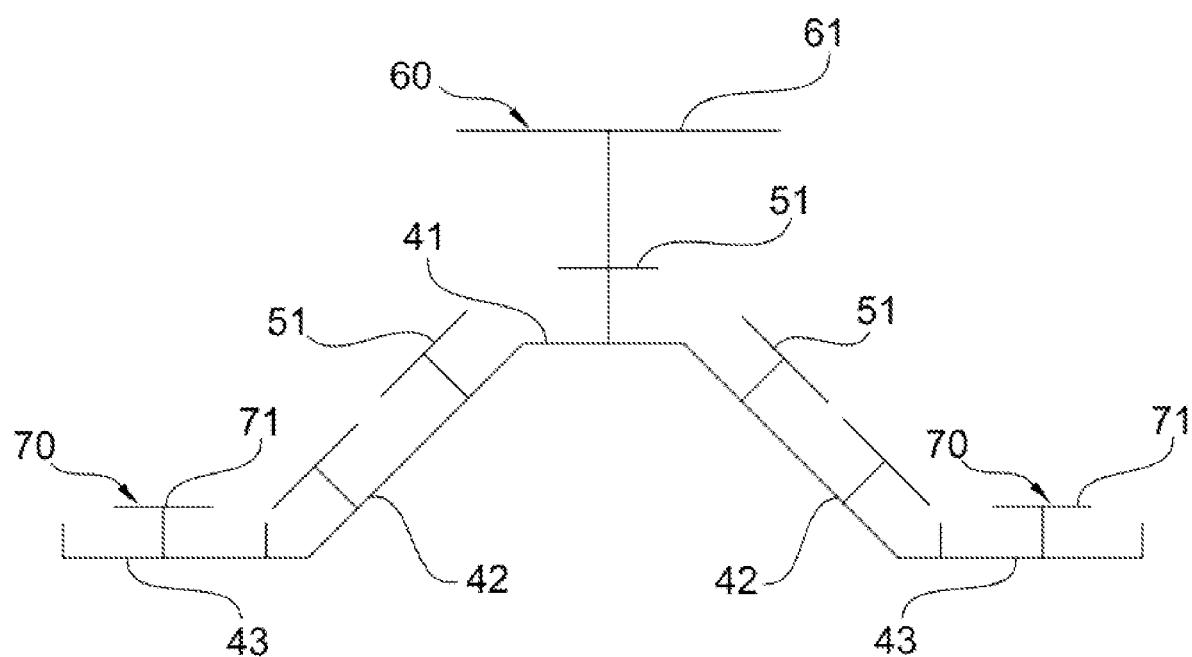
FIG. 5 is a schematic side view of another hybrid network antenna according to some embodiments of the present disclosure.

As shown in FIG. 5, a hybrid network antenna includes a reflector 40, a dual-beam feed network mounted at the reflector 40, a low-frequency antenna array 60, two high-frequency antenna arrays 70, and at least one dual-beam antenna array. Each dual-beam antenna array can be correspondingly connected to a dual-beam feed network. In some embodiments, the reflector 40 can have a width direction and a length direction perpendicular to the width direction. The reflector 40 includes a first straight member 41, bend members 42 arranged at two ends of the first straight member 41, two second straight members 43 connected to the two bend members 42, respectively. The bend member 42 can be formed by bending an end of the first straight member 41. The second straight member 43 can be formed by bending and extending the bend member 42 in a direction away from the first straight member 41. In some embodiments, two ends of the first straight member 41 in the width direction can be bent toward two sides to form the two second bend members 42. The two bend members 42 can further be bent and extended in the direction away from the first straight member 41 to form the two second straight members 43. The two second straight members 43 can be arranged in parallel or approximately parallel to the first straight member 41.

Further, for the structure of the dual-beam antenna subarray 50 and the arrangement of the dual-beam antenna subarray 50 at the reflector 40, reference can be made to the above description. Meanwhile, for the structure of the low-frequency antenna array 60 and the arrangement of the low-frequency antenna array 60 at the reflector 40, reference can be made to the above description.

As shown in FIG. 5, a high-frequency antenna array 70 is arranged at each second straight member 43. The dual-beam antenna array is arranged between the two high-frequency antenna arrays 70. Each high-frequency antenna array 70 includes a second high-frequency radiation unit array 71. The second high-frequency radiation unit array 71 can be staggered with the neighboring first high-frequency radiation unit arrays 51 to reduce interference. The second high-frequency radiation unit array 71 includes a plurality of second high-frequency radiation units arranged at intervals along the length direction of the reflector 40. The plurality of second high-frequency radiation units can be arranged at the second straight member 43 of the reflector 40, for example, arranged in a straight line. In some embodiments, the high-frequency antenna array 70 can be a high-frequency 65° antenna array.

In some embodiments, the number of the dual-beam antenna arrays can be set according to actual needs, for example, 1 or 2. When one dual-beam antenna array is arranged at the reflector 40, the dual-beam antenna array, the low-frequency antenna array 60, and the two high-frequency antenna arrays 70 can form a hybrid network antenna including one low-frequency antenna, two high-frequency antenna arrays 70, and one dual-beam antenna. When two dual-beam antenna arrays are arranged at the reflector 40, the two dual-beam antenna arrays can be arranged at intervals along the length direction of the reflector 40. The two dual-beam antenna arrays, the low-frequency antenna array 60, and two high-frequency antenna arrays 70 can form a hybrid network antenna including one low-frequency antenna array 60, two high-frequency antenna arrays 70, and two dual-beam antennas. During implementation, the low-frequency antenna array 60, the high-frequency antenna arrays 70, and the dual-beam antenna arrays can be freely combined according to actual needs to meet the needs of different regions and/or users.

Figure 6:
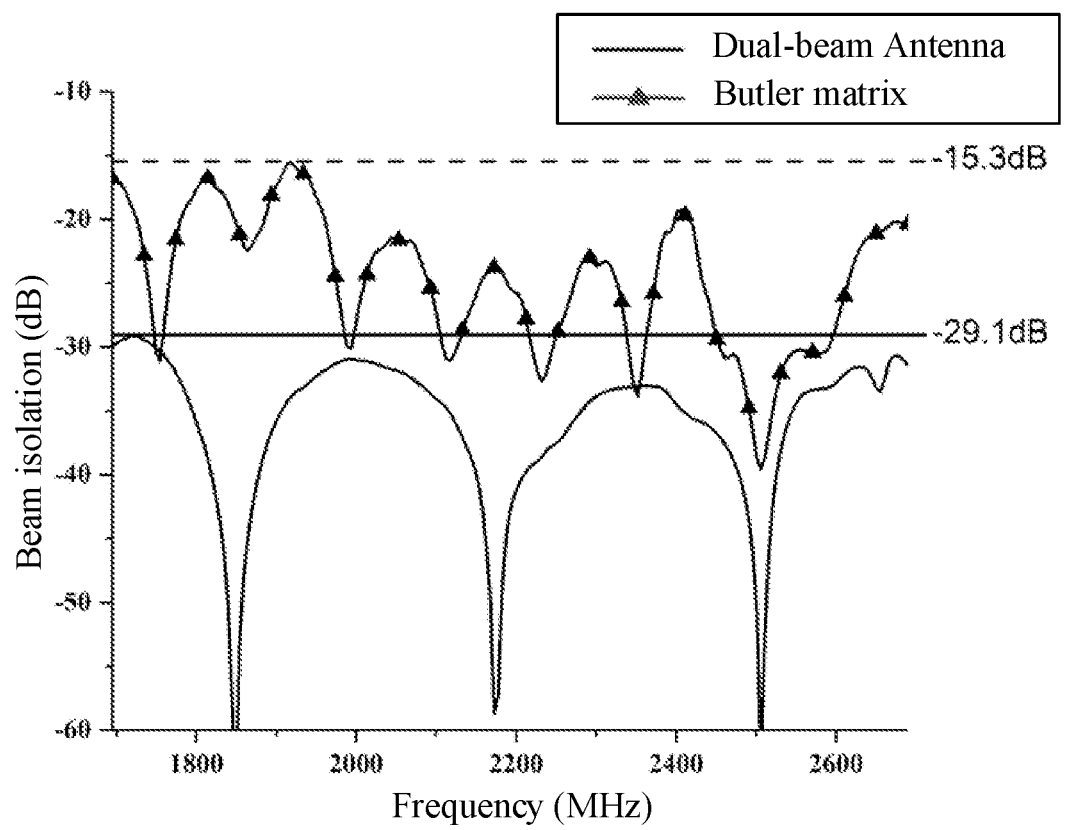
FIG. 6 is a schematic comparison diagram of co-polarization isolation of a dual-beam antenna in a hybrid network antenna according to some embodiments of the present disclosure.

In the hybrid network antenna of the present disclosure, the dual-beam antenna can be configured to realize high co-polarization isolation through the shared high-frequency radiation unit array. Moreover, the number of radiation units can be reduced, the size of the antenna can be effectively reduced, and the base station antenna can be more miniaturized. FIG. 6 shows a co-polarization isolation comparison diagram between the dual-beam antenna and the existing Butler matrix multi-beam antenna. A co-polarization isolation degree of the existing Butler matrix multi-beam antenna is −15 dB, while a co-polarization isolation degree of the dual-beam antenna of embodiments of the present disclosure reaches above −29 dB, which greatly reduces the interference between co-polarized beams.

The technical content and technical features of the present disclosure are described above. However, those skilled in the art can still make various replacements and modifications based on the teachings and disclosures of the present disclosure without departing from the spirit of the present disclosure. Therefore, the scope of the present disclosure should not be limited to the content of embodiments of the present disclosure and should include various replacements and modifications without departing from the present disclosure, which is covered by the claims of the patent application.

What is claimed is:

1. A dual-beam feed network, comprising:
a first power dividing circuit configured to convert a beam signal of a first channel into a plurality of first signals, input one first signal of the plurality of first signals into a third power dividing circuit, and respectively input each remaining first signal of the plurality of first signals to a corresponding first antenna radiation unit;
a second power dividing circuit configured to convert a beam signal of a second channel into a plurality of second signals, input one second signal of the plurality of second signals into the third power dividing circuit, and respectively input each remaining second signal of the plurality of second signals to a corresponding second antenna radiation unit; and
the third power dividing circuit configured to couple and input the received first signal and the received second signal to a third antenna radiation unit,
wherein the beam signal of the first channel and the beam signal of the second channel input to the dual-beam feed network have a same operation frequency.

2. The dual-beam feed network according to claim 1, wherein the first power dividing circuit is one of a power divider and a phase shifter.

3. The dual-beam feed network according to claim 1, wherein the second power dividing circuit is one of a power divider and a phase shifter.

4. The dual-beam feed network according to claim 1, wherein: the third power dividing circuit is one of a coupler and a power divider.

5. The dual-beam feed network according to claim 1, wherein: the third power dividing circuit includes cables that connect the first power dividing circuit and the second power dividing circuit respectively to the third antenna radiation unit.

6. A hybrid network antenna comprising:
a reflector comprising:
a first straight member; and
bend members arranged at two ends of the first straight member, one of the bend members being formed by bending an end of the first straight member, and the reflector having a width direction and a length direction perpendicular to the width direction; and
at least one dual-beam antenna array, each dual-beam antenna array being correspondingly connected to a dual-beam feed network, the dual-beam antenna array including:
two beam antenna sub-arrays, each beam antenna sub-array including a plurality of first high-frequency radiation unit arrays arranged at intervals in the width direction of the reflector, the two beam antenna sub-arrays sharing one first high-frequency radiation unit array, the shared first high-frequency radiation unit array being arranged at the first straight member, and in the two beam antenna sub-arrays, the remaining first high-frequency radiation unit arrays of the one beam antenna sub-array being arranged at intervals at the bend member on one side of the reflector, and the remaining first high-frequency radiation unit arrays in the other beam antenna sub-array being arranged at intervals at the bend member on the other side of the reflector,
wherein the dual-beam feed network comprises:
a first power dividing circuit configured to convert a beam signal of a first channel into a plurality of first signals, input one first signal of the plurality of first signals into a third power dividing circuit, and respectively input each remaining first signal of the plurality of first signals to a corresponding first antenna radiation unit;
a second power dividing circuit configured to convert a beam signal of a second channel into a plurality of second signals, input one second signal of the plurality of second signals into the third power dividing circuit, and respectively input each remaining second signal of the plurality of second signals to a corresponding second antenna radiation unit; and
the third power dividing circuit configured to couple and input the received first signal and the received second signal to a third antenna radiation unit,
wherein the beam signal of the first channel and the beam signal of the second channel input to the dual-beam feed network have a same operation frequency.

7. The hybrid network antenna according to claim 6, wherein the at least one dual-beam antenna array include a plurality of the dual-beam antenna arrays arranged at intervals at the reflector along the length direction of the reflector.

8. The hybrid network antenna according to claim 6, wherein a cross section of the reflector is trapezoidal.

9. The hybrid network antenna according to claim 6, further comprising:
a low-frequency antenna array arranged at the first straight member, including:
a plurality of low-frequency radiation units arranged at intervals along the length direction of the reflector.

10. The hybrid network antenna according to claim 6, wherein:
at least one bend member of the reflector is bent and extended in a direction away from the first straight member to form a second straight member; and
a high-frequency antenna array is arranged at the second straight member.

11. The hybrid network antenna according to claim 10, wherein:
the two bend members of the reflector are bent and extended in the direction away from the first straight member to form two second straight members;
a high-frequency antenna array is arranged on each of the second straight members; and
the dual-beam antenna array is arranged between the two high-frequency antenna arrays.

12. The hybrid network antenna according to claim 10, wherein:
the high-frequency antenna array includes a second high-frequency radiation unit array; and
the second high-frequency radiation unit array is staggered with neighboring first high-frequency radiation unit arrays.

* * * * *